US007603659B2

(12) United States Patent
Blumenthal et al.

(10) Patent No.: US 7,603,659 B2
(45) Date of Patent: Oct. 13, 2009

(54) ACTIVATING ASSERTIONS AND BREAKPOINTS

(75) Inventors: Andreas Blumenthal, Heidelberg (DE); Wilfried Ehrensperger, Malsch (DE); Mathias Hanbuch, Mannheim (DE); Wolf Hagen Thuemmel, Heppenheim (DE)

(73) Assignee: SAP Aktiengesellschaft, Walldorf ( * ) Notice: Subject to any disclaimer, the term of this patent is extended or adjusted under 35 U.S.C. 154(b) by 687 days.

(21) Appl. No.: 10/659,056

(22) Filed: Sep. 9, 2003

(65) Prior Publication Data

US 2005/0055605 A1   Mar. 10, 2005

(51) Int. Cl.
*G06F 9/44* (2006.01)
*G06F 9/45* (2006.01)
(52) U.S. Cl. .................. 717/128; 717/129; 717/130; 717/158
(58) Field of Classification Search .................. None
See application file for complete search history.

(56) References Cited

U.S. PATENT DOCUMENTS

| 6,378,125 | B1* | 4/2002 | Bates et al. ............... 717/129 |
| 6,701,518 | B1* | 3/2004 | Dwyer et al. .............. 717/126 |
| 6,798,713 | B1* | 9/2004 | Yearsley et al. .......... 365/238.5 |
| 6,862,694 | B1* | 3/2005 | Tormey et al. ............... 714/34 |
| 6,981,248 | B2* | 12/2005 | Bates et al. ............... 717/129 |
| 2003/0208746 | A1* | 11/2003 | Bates et al. ............... 717/129 |
| 2003/0217354 | A1* | 11/2003 | Bates et al. ............... 717/129 |
| 2004/0226003 | A1* | 11/2004 | Bates et al. ............... 717/129 |
| 2005/0273765 | A1* | 12/2005 | Arnold et al. ............. 717/129 |

OTHER PUBLICATIONS

"Assertions and Protocol for the OASIS Security Assertion Markup Language (SAML)", published Nov. 5, 2002. Online retrieved at <http://saml.xml.org/saml-specifications>.*
"Dynamically authorized role-based access control for secure distributed computation", Kuo et al., Nov. 2002, pp. 97-103. Online retrieved at <http://delivery.acm.org/10.1145/770000/764807/p97-kuo.pdf>.*
"The pointer assertion logic engine", Moller et al., Jun. 2001, pp. 221-231. Online retrieved at <http://delivery.acm.org/10.1145/380000/378851/p221-moller.pdf>.*
"On systematic design of globally consistent executable assertions in embedded software", Jhumka et al., Jun. 2002, pp. 75-84. Online retrieved at <http://delivery.acm.org/10.1145/520000/513843/p75-jhumka.pdf>.*

* cited by examiner

*Primary Examiner*—Tuan Q Dam
*Assistant Examiner*—Thuy Dao
(74) *Attorney, Agent, or Firm*—Fish & Richardson P.C.

(57) ABSTRACT

Methods and apparatus, including computer program products, for activating assertions and breakpoints. The techniques include establishing any number of checkpoints in a first computer program; and including each checkpoint in a checkpoint group, wherein each checkpoint group can include any number of the checkpoints regardless of where the checkpoints are in the first computer program. The checkpoints can include assertion statements and breakpoint statements. Activation variants enable checkpoint groups or compilation units or both to be managed jointly.

24 Claims, 4 Drawing Sheets

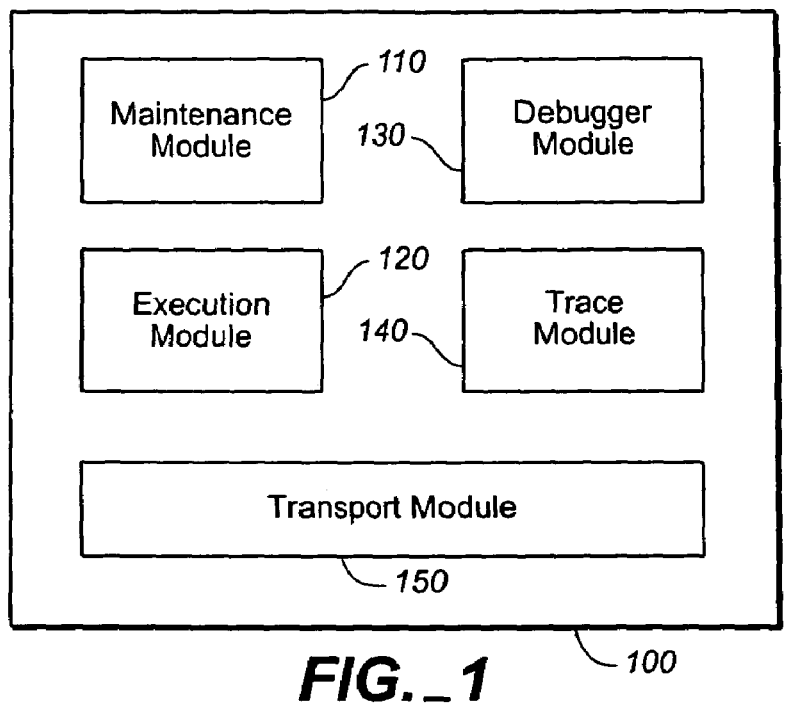
FIG._1
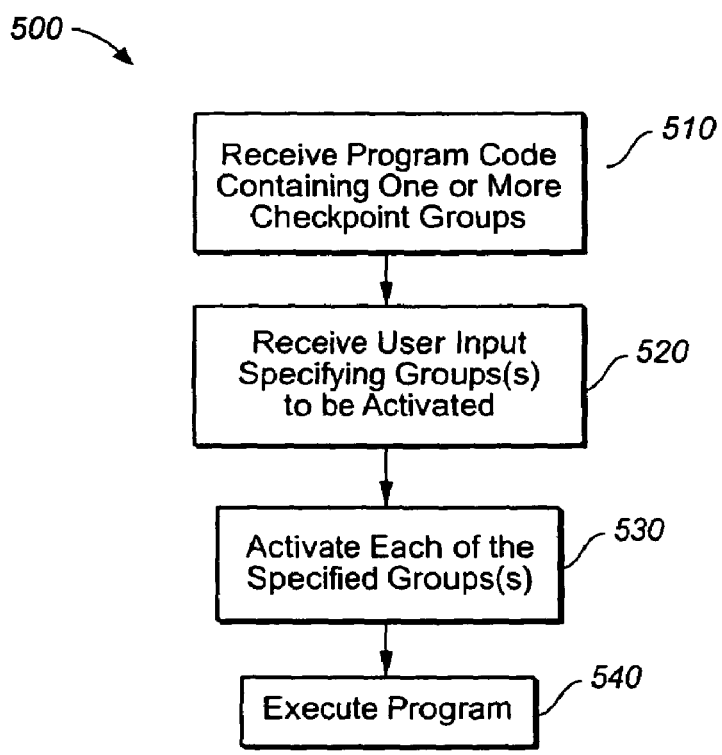
FIG._5

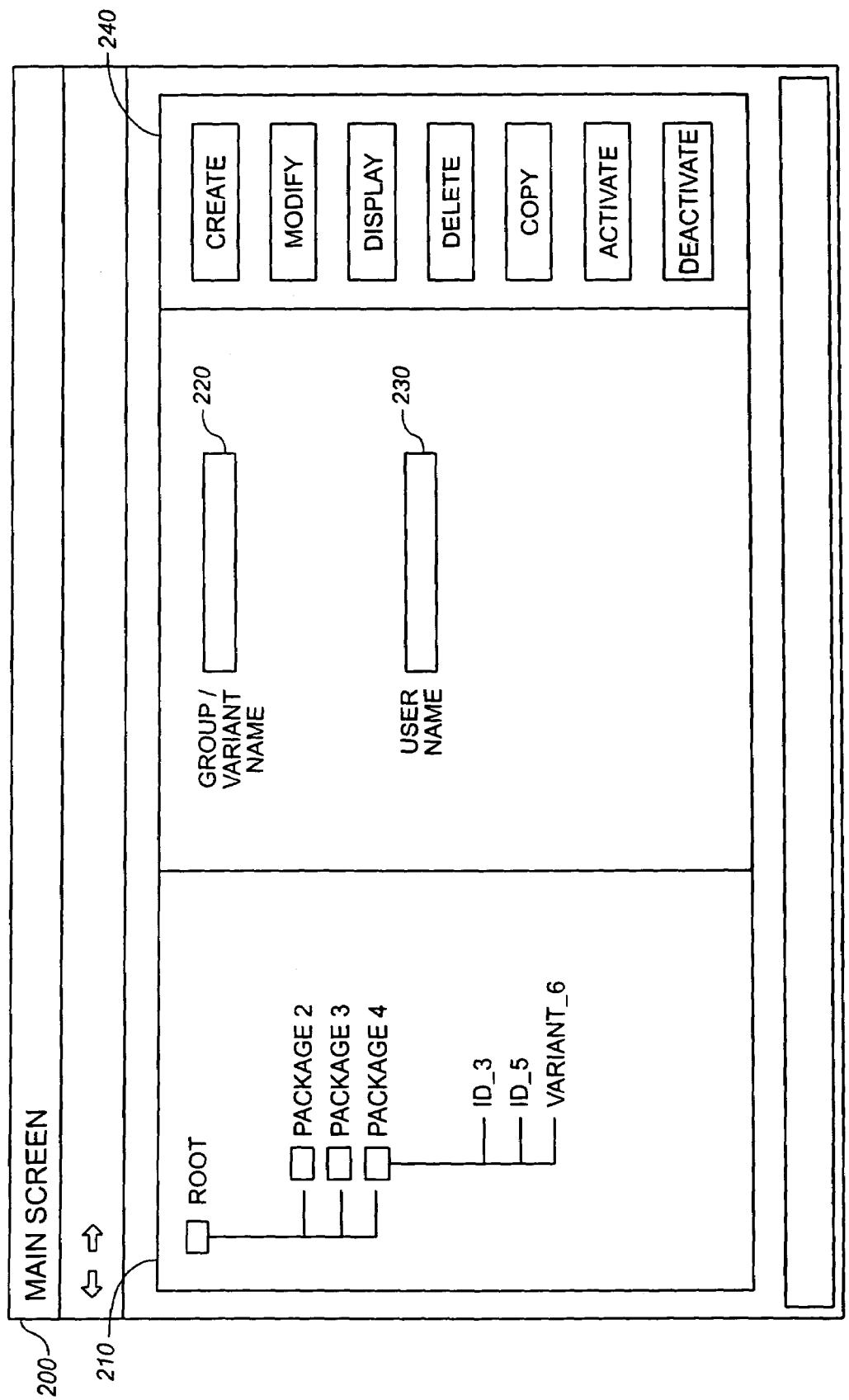
FIG._2

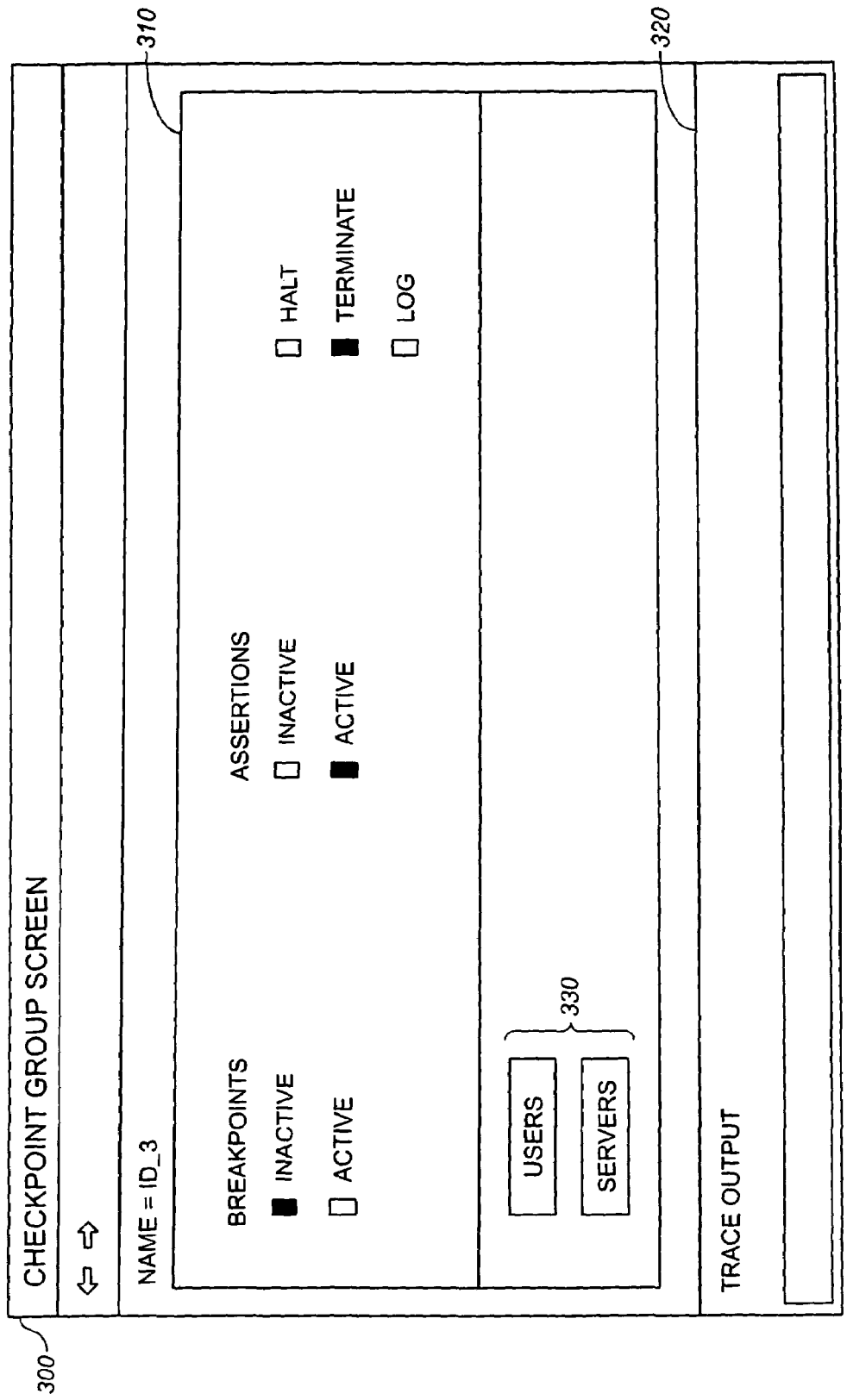
FIG._3

VARIANT SCREEN

NAME = VARIANT_6

| MEMBER NAME | BREAKPOINT SETTINGS | ASSERTIONS SETTINGS |
|---|---|---|
| ID_2 | INACTIVE | ACTIVE, LOG |
| CLASS_INTERFACE | ACTIVE | INACTIVE |
| | | |
| | | |
| | | |
| | | |

ACTIVATING ASSERTIONS AND BREAKPOINTS

BACKGROUND

The present invention relates to computer programming and, more particularly, relates to activating assertions and breakpoints in computer programs.

A breakpoint is program code that halts the execution of a computer program. An assertion is code that tests whether a specified condition is true or false. Assertions and breakpoints are useful for consistency checks and debugging purposes. However, the execution of assertions can hurt performance, and the presence of breakpoints is undesirable in live applications.

SUMMARY OF THE INVENTION

The present invention provides methods and apparatus, including computer program products, for activating assertions and breakpoints.

In general, in one aspect, the invention provides methods and apparatus, including computer program products, for activating assertions and breakpoints. A program according to this aspect has instructions operable to establish any number of checkpoints in a first computer program; and include each checkpoint in a checkpoint group, wherein each checkpoint group can include any number of the checkpoints regardless of where the checkpoints are in the first computer program.

Advantageous implementations of the invention include one or more of the following features. The checkpoints comprise assertion statements and breakpoint statements. Each assertion statement when activated tests whether a specified assertion condition is true or false. Each breakpoint statement when activated halts program execution when it is encountered during program execution. The assertion statements comprise an assertion statement having an argument to activate logging with programmer-controlled granularity.

The program comprises instructions to establish activation variants to enable checkpoint groups or compilation units or both to be managed jointly.

The program comprises instructions to receive a control input activating a first checkpoint group and activate the checkpoints in the first checkpoint group. The control input specifies a mode and the mode comprises one of activating checkpoints that are assertions to terminate on assertion failure, activating checkpoints that are assertions to log status on assertion failure, and activating checkpoints that are assertions to break in a debugger on assertion failure.

The program comprises instructions to receive a control input specifying a scope. The scope specifies that activating is to be performed only for a particular user of the first computer program, that activating is to be performed only for a particular server on which the first computer program is running, or that activating is to be performed globally.

The program comprises instructions to establish a development environment for developing the first computer program in which the checkpoint groups are development objects.

The checkpoints and the first computer program are in a source code form. The checkpoints and the first computer program are in a compiled form.

The invention can be implemented to realize one or more of the following advantages. Assertions and breakpoints can be executed as part of the program code and can be activated dynamically during run time. Assertions and breakpoints can be activated as needed and then deactivated when they are no longer needed. This minimizes the burden on performance. The activation can be configured differently for assertions and breakpoints.

The use of checkpoint groups enables assertions and breakpoints to be managed independently of their location in the code. Any subset of the assertions and breakpoints in the code can be grouped together and managed collectively as a semantic unit. Breakpoints and assertions can be deactivated in live applications without removing them from the source code.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 is a block diagram of a system in accordance with the invention.

FIG. 2 is a screen shot of a maintenance screen in accordance with the invention.

FIG. 3 is a screen shot of a maintenance screen in accordance with the invention.

FIG. 4 is a screen shot of a maintenance screen in accordance with the invention.

FIG. 5 is a flow diagram of a method in accordance with the invention.

Like reference numbers and designations in the various drawings indicate like elements.

DETAILED DESCRIPTION

The present invention provides systems and methods, including computer program products, for organizing and activating assertions and breakpoints by name.

In this specification, assertions and breakpoints will be referred to collectively as checkpoints. Checkpoints are typically defined by statements in a program. A checkpoint can be made a member of a checkpoint group by associating a checkpoint group name with the checkpoint. In source code, this can be done by providing for an optional argument to a checkpoint statement that names the checkpoint group. A checkpoint that can be activated, by activating a checkpoint group, for example, will be referred to as an "activatable" checkpoint. The selection of which checkpoint group a given checkpoint will belong to, if any, can be made independently of the location of the checkpoint, so that the structure of checkpoint groups is independent of the structure of the program code.

Any number of checkpoints can be in the same checkpoint group. Additional levels of grouping and management can be defined by using activation variants. The term "variant" is used here to refer to a persistable and transportable collection of values for parameterizing some kind of process. An "activation variant" is a persistable and transportable collection of values to parameterize the process of activating checkpoints with regard to a set of checkpoints to be activated (whether by checkpoint group, by compilation unit, or otherwise) and the behavior in case an assertion fails (e.g., terminate program execution, stop in debugger, or write to log and resume execution).

Activation variants enable multiple checkpoint groups to be managed jointly. For example, the checkpoint groups for all the checkpoints related to a particular use case in different programs can be brought together in a single activation variant. Activation of the activation variant activates all the checkpoint groups parameterized by the activation variant.

FIG. 1 shows a system 100 in accordance with the invention. The system 100 includes a maintenance module 110, an execution module 120, a debugger module 130, a trace module 140 and, optionally, a transport module 150. Although shown here as organized in these particular modules, the functionality can be organized in any fashion.

The maintenance module 110 manages and provides access to checkpoint groups and activation variants. The maintenance module 110 will be described in more detail below in reference to FIGS. 2-4. The execution module 120 executes program code. Any checkpoints in the program code are executed as part of the code. The debugger module 130 stops program execution and displays the contents of variables used by the program. The trace module 140 collects and stores information on events that occur during program execution. The information can include, for example, a time stamp and frequency. The trace module 140 stores the collected information in memory and periodically saves the information into a database.

The transport module 150 exports development objects (e.g., programs, checkpoint groups, and activation variants) from a source environment into a target environment that is remote from the source environment. The export might be done as part of a distribution process for distributing programs to end-user customers, for example. Out of caution, checkpoint groups are transported inactive, although settings could be transported if that were found to be desirable.

The source environment can be a development environment and the target environment can be a production environment. The checkpoint groups and activation variants are created as development objects, which are objects that can be created and managed by the development environment (e.g., data structures, functions, programs, screens, documentation, checkpoint groups, and activation variants). The checkpoint groups and activation variants can be used in the same manner as other development objects. This enables the checkpoint groups and activation variants to be managed using the development tools provided by the development environment (e.g., automatic object creation tools, navigation tools, where-used lists). This also enables the checkpoint groups and activation variants to be transported in the same manner as other development objects.

Creating and Configuring Checkpoint Groups and Activation Variants

The maintenance module 110 provides a user interface through which application developers can create and configure checkpoint groups and activation variants. One implementation of the user interface is illustrated by FIGS. 2-4 and further described below.

As shown in FIG. 2, a main screen 200 displays a listing 210 of checkpoint groups and activation variants. The listing can be arranged in a hierarchical or tree-like directory structure.

The main screen 200 also displays one or more input fields that are used to receive control input specifying a checkpoint group or activation variant. The input fields can include an checkpoint group/activation variant name 220 field and a user name 230 field. The user name 230 field can be used to select a checkpoint group or activation variant that is only accessible by particular users.

The main screen 200 also displays one or more input fields 240 that are used to select an action to be performed on the selected checkpoint group or activation variant. The operations can include one or more of the following actions:

Create—Create a new checkpoint group or activation variant.

Modify—Modify the settings of a checkpoint group or activation variant.

Display—Display the settings of a checkpoint group or activation variant.

Delete—Delete a checkpoint group or activation variant.

Copy—Copy a checkpoint group or activation variant.

Activate—Activate a checkpoint group or activation variant.

Deactivate—Deactivate a checkpoint group or activation variant.

As shown in FIG. 3, a checkpoint group screen 300 displays the settings 310 for a particular checkpoint group. The settings determine the run-time behavior of the checkpoints in that checkpoint group. The settings include an activation status and mode. The status specifies whether the checkpoint group is active or inactive. The mode specifies how an activated assertion will behave on failure of its assertion condition.

From the checkpoint group screen 300, users can modify the values of the settings 310. The activation status can be set to active or inactive. If the activation status is set to inactive, the checkpoints in the checkpoint group are ignored by the system during run time. The mode can be set to one of the following values:

Halt—Pause execution of the program and initiate execution of a debugger for the program. This mode is appropriate for a developer using the program.

Terminate—Terminate execution of the program and generate a dump. This mode can be used when initiation of the debugger is not appropriate, for example, during actual production use of the program.

Log—Log information about the state of the program and continue execution of the program. This mode is appropriate for longer-term monitoring of the program, to locate errors that occur infrequently, for example.

A user can specify one mode that applies when the program is executed in the foreground processing and another mode that applies when the program is executed in the background—for example, Halt in foreground and Log in background.

From the checkpoint group screen 300, users can also set the activation scope 330. The scope of a particular activation can be restricted to a particular server or user. A server-specific activation allows the analysis of problems that occur only on certain servers. A user-specific activation enables a user to perform error analysis without affecting other users' use of the program.

From the checkpoint group screen 300, users can also view the trace output 320 collected for any of the checkpoints belonging to a given checkpoint group. , As shown in FIG. 4, an activation variant screen 400 enables users to view and modify settings for a particular activation variant. As described above, multiple checkpoint groups can be mapped to a single activation variant. In addition to checkpoint groups, other program elements can also be mapped to an activation variant. For example, compilation units (executable programs) can be mapped to a single activation variant. In this way, all the checkpoints in the corresponding compilation units can be controlled using a single name.

An activation variant can be specified to have a particular mode.

When the activation variant is activated, the activating user can select the scope of activation.

Using Checkpoint Groups and Activation Variants in Program Code

The following paragraphs describe the use of checkpoint groups and activation variants in program code according to one implementation of the invention in the ABAP programming language. In this implementation, the programming language is extended to include the following assert statement:

ASSERT [ID id [SUBKEY subkey] [FIELDS f1 . . . fn ] CONDITION ] logExpr

The ID parameter specifies the checkpoint group name (which identifies the group) to be associated with the assertion. The CONDITION parameter specifies the condition that is tested by the assertion.

The following example illustrates use of the CONDITION parameter to test whether a=b:

ASSERT a=b

The FIELDS and SUBKEY parameters are used by the trace module 140 (FIG. 1) for logging. The logged data can be the value of a field, for example, a and b, as illustrated below:

ASSERT FIELDS a b CONDITION a=b

Alternatively, the logged data can be the value of an expression, for example, the value of a+b−c, as illustrated below:

```
ASSERT ID my_id
SUBKEY lcl_my_assertion=>offset
FIELDS a+b−c
CONDITION ( lcl_my_assertion=> state_okay( x = a y = b z = c ) =
true )
CLASS lcl_my_assertion DEFINITION:
PUBLIC SECTION.
    CLASS-METHODS state_okay
        IMPORTING
            x TYPE i
            y TYPE i
            z TYPE i
        RETURNING
            value(result) TYPE bool.
        CLASS-DATA offset(11) TYPE c READ-ONLY.
ENDCLASS.
CLASS lcl_my_assertion IMPLEMENTATION.
METHOD state_okay.
    DATA offset_i TYPE i.
    offset_i = x + y − z.
    IF offset_i = 0.
        result = true.
    ELSE.
        MOVE offset_i TO offset.
        result = false.
    ENDIF.
ENDMETHOD.
ENDCLASS.
```

The SUBKEY can be set to indicate that for each distinct value of the named field, a log entry is made. In one implementation, the default behavior is to update the log entry on each assertion failures so that the entry shows only the last set of field values and a count of the number of failures; in this context, the SUBKEY argument can be used to control the granularity of logging and aggregate logging in a programmer-controlled way.

Run-time Behavior

As shown in FIG. 5, during run time, the system receives a computer program whose code contains checkpoints associated with one or more checkpoint groups (510). Each checkpoint group can include any number of assertions and any number of breakpoints. The code can also contain checkpoints that are not part of any checkpoint group.

The system can receive user input specifying one or more checkpoint groups or compilation units to be activated (520), including their mode and scope. These can be specified directly or through activation variants. When such user input is received, the system activates each of the specified groups (530). This causes the checkpoints in the specified groups to be activated dynamically.

The system executes the program code (540). Non-activatable checkpoints are always executed. Activatable checkpoints are executed only when active. In one implementation, an activatable assertion or breakpoint is guarded by a lookup process to determine the activation status of the associated checkpoint group. If it is active, then the assertion or breakpoint is executed.

To make the lookup operation efficient, information about checkpoint groups is included with a compiled program. This information is used when the program is loaded, at which time the status of the associated checkpoint groups is checked and the status is cached. (In this implementation, if a user changes the status of a checkpoint group, the change is not effective until the next time the program is executed, i.e., the next time it is loaded.) At the same time, whether any compilation unit is active is also checked. From this information, when a compilation unit is loaded, a flag is set if all checkpoint groups in the compilation unit are inactive.

The lookup process first checks the flag for the compilation unit in which the current checkpoint is found. If it is set, the process is done and the current checkpoint is not executed. Otherwise, the process checks whether all checkpoints are activated. If so, the process is done and the current checkpoint is executed. Otherwise, the individual checkpoint groups are checked to determine whether the current checkpoint is activated. To make this efficient, checkpoint group names are initially mapped to indices that are used for a fast lookup of the corresponding group status.

Some system architectures allow one program to run another program through a remote call facility. In one implementation, an extension is provided to the remote call facility that transfers the caller's activation status information to the callee program environment, so that the activation status of the caller will apply when the callee program is executed for the caller, as has been described. In this implementation, whether the activation status is transferred is controlled by the user as part of the activation process (otherwise described in reference to FIG. 3), and the activation can optionally be defined so that the user can determine whether it applies to all callee programs or only to callee programs on the same server as the caller.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network, a wide area network, and the Internet.

The invention has been described in terms of particular embodiments. Other embodiments are within the scope of the following claims. For example, the steps of the invention can be performed in a different order and still achieve desirable results.

What is claimed is:

1. A method, comprising:
   receiving a computer program having a plurality of checkpoints, each checkpoint being assigned to at least one of a plurality of checkpoint groups, each checkpoint and each checkpoint group being identified by a group identifier, each checkpoint in the plurality of checkpoints including an assertion statement that tests whether a specified condition is true, and a breakpoint that halts execution of the computer program, the assertion statement including an argument to activate logging with programmer-controlled granularity, the argument being used to determine whether to update a log entry when the assertion statement fails, the assignment of each checkpoint to a checkpoint group being specified in a statement defining the respective checkpoint, the statement including the group identifier identifying the checkpoint group, and each checkpoint group including a respective identification;
   associating each checkpoint group with one of a plurality of activation variants that indicates a behavior based on a result of the assertion statement, wherein checkpoint groups associated with an activation variant behave in accordance with the activation variant;
   selectively activating at least one checkpoint group based on the respective identification;
   indicating the activation variant of the plurality of activation variants, in accordance with the at least one checkpoint group is to behave; and
   executing the computer program based on selectively activating the at least one checkpoint group and indicating the activation variant, wherein only the at least one checkpoint group of the computer program is executed, and a remainder of the plurality of checkpoint groups, if any, is not executed.

2. The method of claim 1, further comprising:
   receiving a user input specifying a mode of invocation of checkpoints; and
   invoking checkpoints according to the specified mode.

3. The method of claim 1, further comprising:
   receiving a further user input specifying a scope of invocation of checkpoints, the scope specifying that checkpoints are to be invoked only for a particular user of multiple users using the computer program; and
   invoking checkpoints according to the specified scope.

4. The method of claim 1, further comprising:
   receiving a further user input specifying a scope of invocation of checkpoints, the scope specifying that checkpoints are to be invoked only for a particular server of multiple servers on which the computer program is running; and
   invoking checkpoints according to the specified scope.

5. The method of 1, wherein the checkpoint groups and the activation variants are established in a maintenance module, and affect operation of a separate debugger module.

6. The method of claim 1, further comprising:
   receiving user input to invoke checkpoints as a group according to their group identifiers;
   executing a non-activatable checkpoint; and
   selectively executing at least one checkpoint of the plurality of checkpoints based on an activation status of the checkpoint group.

7. A method for adding checkpoints to a computer program having source code, the method comprising:
   adding to the computer program a plurality of checkpoints each assigned to a checkpoint group of a plurality of checkpoint groups by a respective group name for the checkpoint, each checkpoint in the plurality of checkpoints including an assertion statement that tests whether a specified condition is true, and a breakpoint that halts execution of the computer program, the assertion statement including an argument to activate logging with programmer-controlled granularity, the argument being used to determine whether to update a log entry when the assertion statement fails, the assignment of each checkpoint to a checkpoint group being specified in a statement defining the respective checkpoint, and each checkpoint group including a respective identification;

associating each checkpoint group with one of a plurality of activation variants that indicates a behavior based on a result of the assertion statement, wherein checkpoint groups associated with an activation variant behave in accordance with the activation variant;

selectively activating at least one checkpoint group based on the respective identification;

indicating the activation variant of the plurality of activation variants, in accordance with the at least one checkpoint group is to behave; and executing the computer program based on selectively activating the at least one checkpoint group and indicating the activation variant, wherein only the at least one checkpoint group of the computer program is executed, and a remainder of the plurality of checkpoint groups, if any, is not executed.

8. The method of claim 7, further comprising:

adding the plurality of checkpoints to the source code of the computer program, the respective group name for each checkpoint being included in the source code for the checkpoint; and transporting the checkpoint groups as development objects with the computer program from a development environment to a production environment, the development objects being objects created and managed by the development environment.

9. The method of 7, wherein the checkpoint groups and the activation variants are established in a maintenance module, and affect operation of a separate debugger module.

10. The method of claim 7, further comprising adding to the computer program at least one checkpoint as a non-activatable checkpoint, which non-activatable checkpoint is executed regardless of an activation status of the checkpoint group.

11. A machine-readable storage device encoded with a computer program comprising instructions that, when executed, operate to cause a computer to perform operations comprising:

establishing a plurality of checkpoints in a computer program, the computer program having a program structure, each checkpoint in the plurality of checkpoints including an assertion statement that tests whether a specified condition is true, and a breakpoint that halts execution of the computer program, the assertion statement including an argument to activate logging with programmer-controlled granularity, the argument being used to determine whether to update a log entry when the assertion statement fails;

assigning each checkpoint in the plurality of checkpoints to a checkpoint group of a plurality of checkpoint groups, the assignment of each checkpoint to the checkpoint group being specified in a statement defining the respective checkpoint, and each checkpoint group including a respective identification;

associating each checkpoint group with one of a plurality of activation variants that indicates a behavior based on a result of the assertion statement, wherein checkpoint groups associated with an activation variant behave in accordance with the activation variant;

selectively activating at least one checkpoint group based on the respective identification;

indicating the activation variant of the plurality of activation variants, in accordance with the at least one checkpoint group is to behave; and executing the computer program based on selectively activating the at least one checkpoint group and indicating the activation variant, wherein only the at least one checkpoint group of the computer program is executed, and a remainder of the plurality of checkpoint groups, if any, is not executed.

12. The machine-readable storage device of claim 11, wherein the operations further comprise:

receiving a control input activating a first checkpoint group; and activating the checkpoints in the first checkpoint group.

13. The machine-readable storage device of claim 12, wherein the operations further comprise:

receiving a control input that specifies a mode in which checkpoints that are assertions terminate on assertion failure;

receiving a control input that specifies a mode in which checkpoints that are assertions log status on assertion failure; and receiving a control input that specifies a mode of activating checkpoints in which assertions break in a debugger on assertion failure.

14. The machine-readable storage device of claim 12, wherein the operations further comprise:

receiving a control input specifying that activating is to be performed only for a particular user of multiple users using the computer program, the activating not affecting the use of the computer program by other users.

15. The machine-readable storage device of claim 12, wherein the operations further comprise:

receiving a control input specifying that activating is to be performed only for a particular server of multiple servers on which the computer program is running.

16. The machine-readable storage device of claim 11, further comprising instructions to establish a development environment for developing the computer program in which the checkpoint groups are development objects.

17. The machine-readable storage device of claim 11, wherein the checkpoints and the computer program are in a compiled form.

18. The machine-readable storage device of claim 11, wherein:

the argument to activate logging indicates that a log entry is made for each distinct value of a named field.

19. The machine-readable storage device of claim 11, wherein the checkpoint groups and the activation variants are established in a maintenance module, and affect operation of a separate debugger module.

20. The machine-readable storage device of claim 11, wherein the operations further comprise:

executing a non-activatable checkpoints; and selectively executing at least one checkpoint of the plurality of checkpoints based on an activation status of the checkpoint group.

21. An apparatus, comprising:

means for establishing a plurality of checkpoints in a computer program, the computer program having a program structure, each checkpoint in the plurality of checkpoints including an assertion statement that tests whether a specified condition is true, and a breakpoint that halts execution of the computer program, the assertion statement including an argument to activate logging with programmer-controlled granularity, the argument being used to determine whether to update a log entry when the assertion statement fails;

means for assigning each checkpoint in the plurality of checkpoints to a checkpoint group of a plurality of checkpoint groups, the assignment of each checkpoint to the checkpoint group being specified in a statement defining the respective checkpoint, and each checkpoint group including a respective identification;

means for associating each checkpoint group with one of a plurality of activation variants that indicates a behavior based on a result of the assertion statement, wherein checkpoint groups associated with an activation variant behave in accordance with the activation variant;

means for selectively activating at least one checkpoint group based on the respective identification;

means for indicating the activation variant of the plurality of activation variants, in accordance with the at least one checkpoint group is to behave; and means for executing the computer program based on selectively activating the at least one checkpoint group and indicating the activation variant, wherein only the at least one checkpoint group of the computer program is executed, and a remainder of the plurality of checkpoint groups, if any, is not executed.

22. The apparatus of claim 21, further comprising:

means for associating an activation variant with a compilation unit.

23. The apparatus of claim 21, wherein the means for establishing, the means for assigning, and the means for associating are provided in a maintenance module, and wherein the checkpoint groups and the activation variants affect operation of a separate debugger module.

24. The apparatus of claim 21, further comprising means for executing a non-activatable checkpoint, and for selectively executing at least one checkpoint of the plurality of checkpoints based on an activation status of the checkpoint group.

* * * * *

UNITED STATES PATENT AND TRADEMARK OFFICE
CERTIFICATE OF CORRECTION

PATENT NO. : 7,603,659 B2 Page 1 of 1
APPLICATION NO. : 10/659056
DATED : October 13, 2009
INVENTOR(S) : Blumenthal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Fifth Day of October, 2010

David J. Kappos
*Director of the United States Patent and Trademark Office*